(12) United States Patent
Palmer

(10) Patent No.: US 12,235,185 B2
(45) Date of Patent: Feb. 25, 2025

(54) PROBE GUIDING

(71) Applicant: ROLLS-ROYCE plc, London (GB)

(72) Inventor: David I Palmer, Nottingham (GB)

(73) Assignee: ROLLS-ROYCE plc, London (GB)

( * ) Notice: Subject to any disclaimer, the term of this patent is extended or adjusted under 35 U.S.C. 154(b) by 332 days.

(21) Appl. No.: 16/817,701

(22) Filed: Mar. 13, 2020

(65) Prior Publication Data

US 2020/0370997 A1  Nov. 26, 2020

(30) Foreign Application Priority Data

Mar. 20, 2019 (GB) ........................ 1903781

(51) Int. Cl.
*G01M 15/14* (2006.01)
*G01M 15/02* (2006.01)

(52) U.S. Cl.
CPC ............ *G01M 15/02* (2013.01); *G01M 15/14* (2013.01)

(58) Field of Classification Search
CPC . B25J 9/06; B25J 9/1602; B25J 9/1625; B25J 9/1656; B25J 18/06; B25J 9/1664; G01M 15/02; G01M 15/14; G01M 15/00; G01M 15/108; G05B 2219/40234; G05B 2219/40206; G05B 2219/40367
See application file for complete search history.

(56) References Cited

U.S. PATENT DOCUMENTS

| | | | | |
|---|---|---|---|---|
| 8,219,246 B2 * | 7/2012 | Buckingham | ............ | B25J 18/06 901/3 |
| 9,539,726 B2 * | 1/2017 | Simaan | .................. | B25J 9/1602 |
| 11,084,169 B2 * | 8/2021 | Graham | ................. | B25J 9/1664 |
| 2009/0222133 A1 | 9/2009 | Buckingham et al. | | |
| 2017/0028556 A1 * | 2/2017 | Summer | ................ | B25J 9/1664 |
| 2019/0054638 A1 * | 2/2019 | Norton | ........................ | B25J 9/06 |
| 2019/0063223 A1 * | 2/2019 | Lipkin | .................... | F01D 5/005 |
| 2019/0277770 A1 * | 9/2019 | Mekala | ................ | G01N 21/954 |
| 2019/0360794 A1 * | 11/2019 | Graham | ................ | G01M 15/14 |

(Continued)

FOREIGN PATENT DOCUMENTS

| | | | | |
|---|---|---|---|---|
| CA | 3008406 A1 * | 12/2018 | ............ | G01M 15/14 |
| CN | 103692440 A | 4/2014 | | |
| DE | 19924607 A1 * | 11/2000 | ........... | F01D 21/003 |

(Continued)

OTHER PUBLICATIONS

English machine translation of DE-19924607-A1 (Year: 2000).*

(Continued)

*Primary Examiner* — Giovanni Astacio-Oquendo
*Assistant Examiner* — Martin Walter Braunlich
(74) *Attorney, Agent, or Firm* — Oliff PLC

(57) ABSTRACT

A techniques for improved guiding of hyper-redundant manipulator probes into a constrained space which make use of the known characteristics of the space into which the probe is being inserted to increase the efficiency of the computation of the path of the probe. Embodiments of the invention achieve this through an optimisation function which determined a new orientation which minimises the deviation between each of: a) the point on the probe where the probe starts to follow a defined curve within the constrained space and a predetermined initial point, and b) the distal end of the probe and said defined curve.

11 Claims, 5 Drawing Sheets

(56) References Cited

U.S. PATENT DOCUMENTS

2022/0084178 A1* 3/2022 Peters ............... G06T 15/04

FOREIGN PATENT DOCUMENTS

| DE | 102017218426 B3 * | 1/2019 | ........... F01D 21/003 |
| WO | 2018/037931 A1 | 3/2018 | |

OTHER PUBLICATIONS

English machine translation of DE-102017218426-B3 (Year: 2019).*

Tang, Lei et al. "Design of a Cable-Driven Hyper-Redundant Robot with Experimental Validation." International journal of advanced robotic systems 14.5 (2017): 172988141773445—. Web. (Year: 2017).*

Sep. 20, 2019 Search Report issued in British Application No. 1903781.1.

Park, Wooram et al., "The Path-of-Probability Algorithm for Steering and Feedback Control of Flexible Needles" National Institutes of Health, Int J Rob Res., pp. 813-830, 2010.

Aug. 26, 2020 Extended European Search Report issued in European patent Application No. 20163529.9.

Palmer, David et al., "Real-time method for tip following navigation of continuum snake arm robots" Robotics and Autonomous Systems, vol. 62, pp. 1478-1485, 2014.

* cited by examiner

PROBE GUIDING

BACKGROUND

The present disclosure concerns probes and methods of guiding probes. It is particularly, but not exclusively concerned with guiding probes which are hyper-redundant manipulators, for example for inspection purposes.

Complex machines, such as gas turbine engines, often have hard-to-access areas within their structure where it is not possible for a person to visually inspect or carry out repairs, or even to inspect or reach with a simple hand-held probe. Due to the complexity of the construction of the machine and the desire to retain integrity, it is normally not practical to remove the parts that are blocking access, or to build in access ports and inspection points. For example, the combustion chamber of a gas turbine engine requires regular inspection for faults but, without complex and costly stripdown, can only be reached by remote probes.

Hyper-redundant manipulators are often used for inspection or minimally invasive repairs (as well as other tasks) in such complex or constrained environments, which they can access by "snaking" into the environment. These manipulators have a large number of degrees of freedom and a similar morphology to a tentacle or snake. Common designs use repeating structures of joints, which can either be "continuum" (one or a plurality of flexible rods or springs) or "discrete" (a series of joints with multiple degrees of freedom, joined by rigid arm elements).

As such manipulators rely on redundancy in their movement for their flexibility and ability to reach any destination, the control of their motion is very difficult and highly computationally complex due to the large number of inverse kinematic calculations required.

One approach to navigation of such manipulators is a "tip-following" process, for example as described in Palmer, D., Cobos-Guzman, S., and Axinte, D.: 'Real-time method for tip following navigation of continuum snake arm robots', Robotics and Autonomous Systems, 2014, 62, (10), pp. 1478-1485 ("Palmer et al."), the contents of which are hereby incorporated by reference. In tip-following the robotic arm tries to maintain the desired path (or the path previously travelled) as it is advanced further into the space. Tip-following which treats the tip of the arm as a free-moving point. As this point is moved (advanced or retracted) in the desired direction, an algorithm calculates a new arrangement of the manipulator that moves the tip to the new position whilst minimising the deviation of the remainder of the arm from the path previously travelled.

If the algorithm can proceed quickly enough, then the tip-following can be done "on the fly", in other words as the arm is being moved. In order to achieve uninterrupted real-time movement, the algorithm needs to be capable of determining a new arrangement of the arm in no more than the time taken for the previous change to be performed.

SUMMARY

However, even optimized tip-following processes such as that described in the above reference are still very computationally complex and can therefore struggle to complete the necessary calculations at the speed required without deployment of considerable computing resources.

An object of the present invention is to provide a guide process for a probe and a probe using that process which is computationally more efficient.

A further object of the present invention is to provide a guide process for a probe and a probe using that process which can be more accurate or precise in following the desired path.

At their broadest, aspects of the present invention provide a probe and a method of guiding a probe which make use of the known characteristics of the space into which the probe is being inserted.

A first aspect of the present invention provides a method for guiding a probe inside a constrained space, wherein the probe is a hyper-redundant manipulator comprising a plurality of independently-orientable connected segments extendable between a proximal end and a distal end inside the constrained space, the method including the steps of: determining: an initial point where the probe intersects a predetermined curve which defines a circle or part circle within said space, and an initial bend for the probe between an entry point on a surface of the constrained space and the initial point; and repeatedly: determining a new orientation of said segments which results in an advancement of the distal end to a new position which is on said curve, the new orientation being determined so as to minimise the deviation between each of: a) the point on the probe where the probe starts to follow said curve and the initial point, and b) a point on the probe closer to the distal end than the point where the probe starts to follow said curve and said curve; and adjusting the orientation of said segments to said new orientation and advancing the probe so that the distal end is located at the new position.

A second aspect of the present invention provides a probe system for accessing a constrained space, the probe system comprising: a hyper-redundant manipulator having a plurality of independently-orientable connected segments extendable between a proximal end and a distal end; and a controller, wherein the controller is arranged to control the orientation of said segments so as to position the distal end in a desired position by: determining: an initial point where the probe intersects a predetermined curve which defines a circle or part circle within said space, and an initial bend for the probe between an entry point on a surface of the constrained space and the initial point; and repeatedly: determining a new orientation of said segments which results in an advancement of the distal end to a new position which is on said curve, the new orientation being determined so as to minimise the deviation between each of: a) the point on the probe where the probe starts to follow said curve and the initial point, and b) a point on the probe closer to the distal end than the point where the probe starts to follow said curve and said curve; and sending actuation signals to the manipulator so to as to cause adjustment of the orientation of said segments to said new orientation and advance the probe so that the distal end is located at the new position.

Further aspects of the present invention provide computer programs for running on computer systems which carry out the method of the above first aspect.

The above aspects provide a new approach to guiding the movement of the probe in certain constrained spaces. This approach makes use of the known geometric characteristics of the space to reduce the complexity of the calculations required which may, in turn, lead to increased speed of calculation and movement and/or increased accuracy of the guiding.

The following optional and preferred features can be used in combination with either of the above aspects and are combinable in any combination of some, all or none of the respective features.

The point on the probe whose deviation is compared to the curve in b) may be the distal end of the probe.

Preferably the steps of determining the new orientation and adjusting the manipulator are performed in real-time or substantially in real-time. By "real-time" here, it is meant that the determining step takes the same amount of time, or less time, than the adjusting step, or, put another way, that the speed of movement of the manipulator is not constrained by the computations, but it can be moved at a speed that is subject to its own physical constraints and/or any to any further constraints that may be imposed by an operator (for example to allow sufficient time for the desired inspection or action). By "substantially in real-time" it is meant that no lag or pause in the movement of the manipulator due to the performance of the determining step is evident to an operator.

The probe may carry an end-effector at the distal end. The end-effector will normally be selected based on the desired function(s) of the probe. The end-effector may be interchangeable.

For example, the end-effector may include a detector such as a vision system (e.g. a camera), and may also include an illumination source (such as a light) which may illuminate the interior of the space in order to allow the detector to pick up reflected illumination. Whilst vision systems will mostly operate in the visible spectrum, it will be appreciated that cameras/recording devices and other detectors operating in other spectra (e.g. thermal cameras) or other ranges of the electromagnetic spectrum (e.g. x-rays) may be used depending on the space into which the probe is being inserted and the purpose of using the probe. The end-effector may include a detector without any directly-corresponding source as the source may be located outside the space, or the detector may be arranged to detect radiation from the walls of the space themselves.

The end-effector may alternatively or additionally include grippers, manipulators, air jets, high-speed spindles, etc. as known in the art. Such end-effectors may be used to interact with the walls of the space, or with other objects inside the space.

The constrained space may be toroidal, such that it has an axis of revolution. In such situations, the curve may be a circle or part circle around the axis of revolution of the toroidal space.

The constrained space may be part of an engine, such as a gas turbine engine. For example, the constrained space may be a combustion chamber of a gas turbine engine.

The curve may define a mid point of the space. For example, where the space is toroidal, the curve may be positioned equidistant between an inner surface of the toroid and an outer surface of the toroid. This may be useful where the probe is intended for general inspection of the space. Alternatively the curve may closely follow one of the surfaces of the space. This may be useful where close inspection of a surface of the space is desired, or where physical interaction with the surface is, or may be, desired. For example, where the space is toroidal, the curve may be chosen to be a predetermined distance away from the inner or outer surface of the space.

The entry point may be the point at which the probe enters the constrained space. For example the entry point may be an access hatch or orifice. The entry point may be on any of the surfaces which define the constrained space.

The probe may further include a feed-in mechanism for advancing the probe. The feed-in mechanism may provide for linear advancement of the probe along a defined path towards or through the entry point.

Although the probe may have individual actuators on each segment, it preferably has a main actuation mechanism which is located at or near the proximal end and which is either linked to actuators on each segment or directly drives the motion of each segment. This reduces the weight of the probe itself, which therefore requires less force to manipulate it.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF EMBODIMENTS

Figure 1:
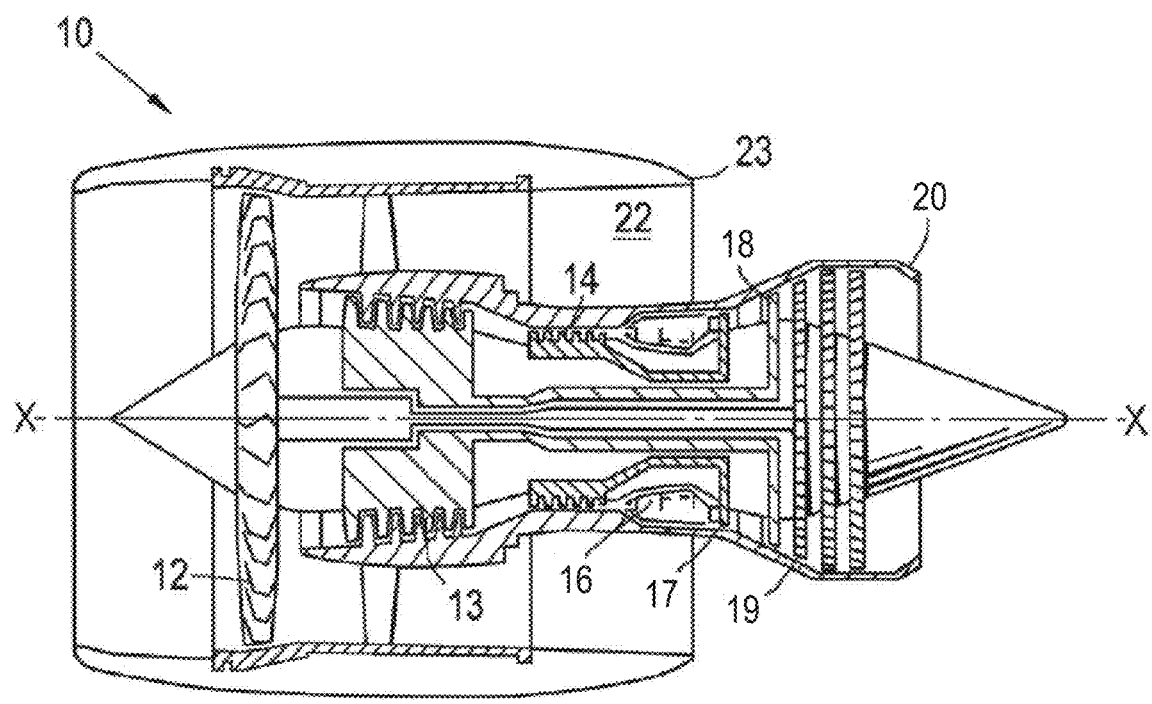
FIG. 1 is a sectional side view of a gas turbine engine such as may be inspected using embodiments of the present invention.

With reference to FIG. 1, a gas turbine engine is generally indicated at 10, having a principal and rotational axis X-X. The engine 10 comprises, in axial flow series, an air intake, a propulsive fan 12, an intermediate pressure compressor 13, a high-pressure compressor 14, combustion equipment 16, a high-pressure turbine 17, an intermediate pressure turbine 18, a low-pressure turbine 19 and an exhaust nozzle 20. A nacelle 23 generally surrounds the engine 10 and defines both the intake and the exhaust nozzle.

The gas turbine engine 10 works in the conventional manner so that air entering the intake is accelerated by the fan 12 to produce two air flows: a first air flow into the intermediate pressure compressor 13 and a second air flow which passes through a bypass duct 22 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 14, intermediate pressure compressor 13 and fan 12, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Gas turbine engines such as those shown in FIG. 1 typically have a number of spaces which are inaccessible to human operators or mechanics, or which have very restricted access. In particular, the combustion chamber(s) 16 of the gas turbine engine 10 may have no practical access by a mechanic, except by "stripping down" the engine and removing various components in order to permit access. Such "stripping down" (and the subsequent rebuilding) is a lengthy and complex process and is not suitable for routine inspection or maintenance tasks. Nevertheless, it is important that areas of the engine such as the combustion chamber(s) are regularly inspected for any wear or irregularities.

Figure 2:
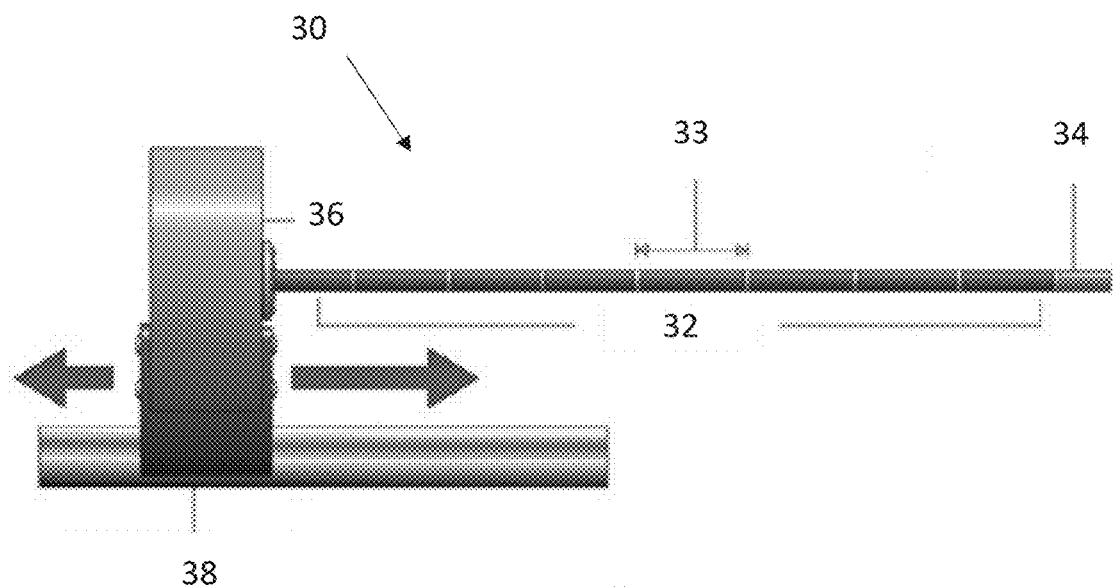
FIG. 2 shows a probe according to an embodiment of the present invention.

FIG. 2 shows, schematically, a hyper-redundant manipulator 30 forming part of a probe system according to an embodiment of the present invention. The hyper-redundant manipulator 30 has four main parts: an arm 32, an end-effector 34, an actuation mechanism 36 and a feed-in mechanism 38.

The end-effector 34 is located at the distal end of the arm 32 and is chosen depending on the scenario for which the probe is to be used. For example, the end-effector 34 may include one or more of a vision system (e.g. a camera device or similar and, optionally, an illumination device), a gripper, a high-speed spindle, etc. The end-effector 34 may be interchangeable so that the same probe system can be used for a variety of purposes.

The actuation mechanism 36 is located at the proximal end of the arm 32. This mechanism drives the movement of the arm 32 either by sending drive signals to individual actuators located on and/or between each section, or by operating actuators which are physically connected to each section (e.g. pneumatically, hydraulically or by cables). By mounting the actuation mechanism 36 at the proximal end, the actuation mechanism 36 (or least part of it) can be kept off the moving part of the arm 32 thereby reducing the weight of the arm and making its motion easier.

The feed-in mechanism 38 allows advancement (and retraction) of the arm 32. The feed-in mechanism 38 provides accurate linear advancement of the arm along the initial trajectory (the orientation of the arm shown in FIG. 2). A range of feed-in mechanisms are known in the art and will not be discussed further here.

The arm 32 is split into a number of distinct sections 33. Each section has two degrees of freedom and can be formed into a curve of any angle (referred to as θ) up to a predetermined maximum angle (usually limited by the design of the sections 33 to a maximum of around 90° or π/2) from the straight-line axis. Further, the section can form this arc such that the tip of the section subtends any desired angle (referred to as q) from an axis perpendicular to the straight-line axis.

The arm 32 depicted in FIG. 2 may be either a discrete design or a continuum design. As the details of the specific designs of arms are well-known in the art they are not described further here.

Figure 3:
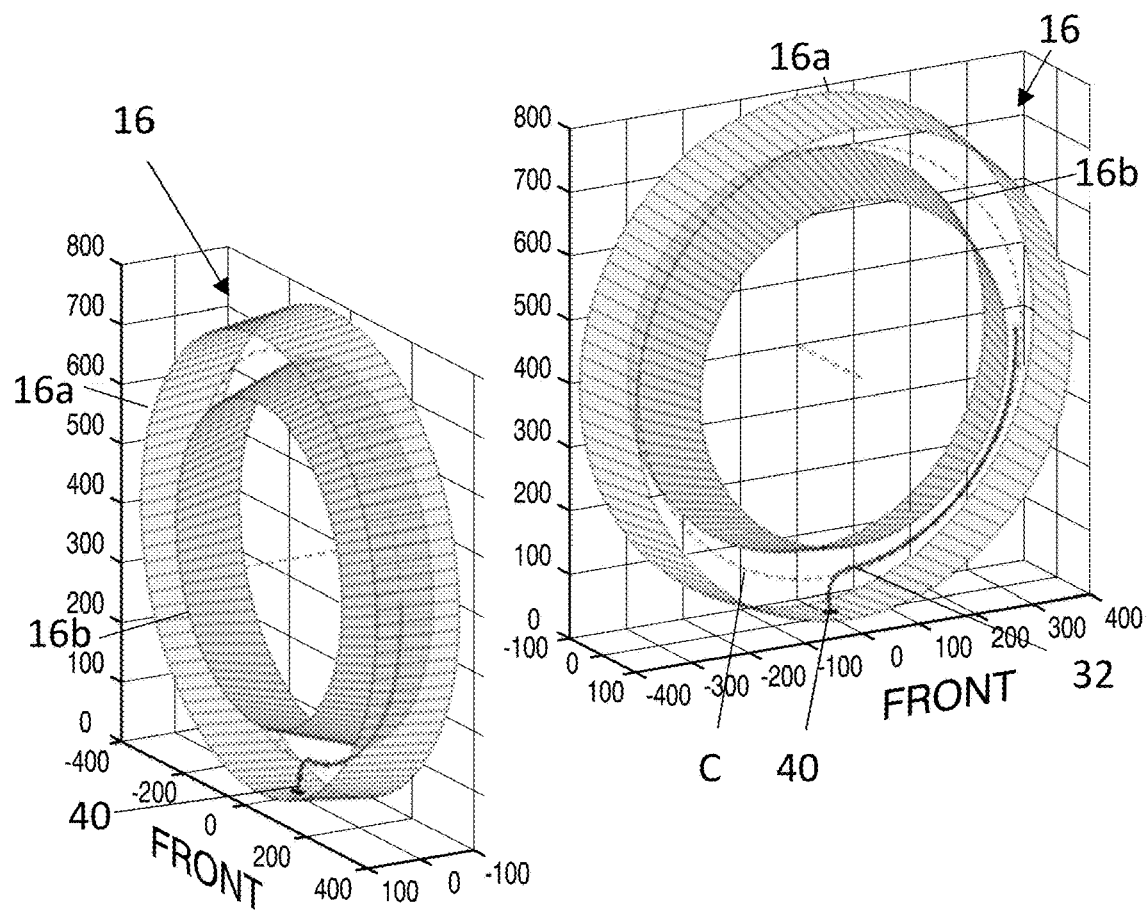
FIG. 3 is a schematic cut-away view of a combustion chamber of a gas turbine engine showing how a probe according to an embodiment of the present invention may be used.

FIG. 3 shows a schematic cut-away view of a combustion chamber 16 of a gas turbine engine such as that shown in FIG. 1. For simplicity, the outer and inner walls forming the main sides of the torus shape of the combustion chamber 16 are shown as a pair of angled rings 16a, 16b. The arm 32 is shown extending into the combustion chamber 16 from an entry port 40 in the outer wall 16a.

In order to perform a general inspection of the combustion chamber 16, it is desired to pass the arm of the probe (which may have, for example, a light source and a camera located at its distal end or tip in order to perform this inspection) around a circular path C which is mid way between the outer and inner walls, 16a, 16b. Due to the torus shape of the combustion chamber 16, the path is well-defined and has a constant curvature.

Figure 4:
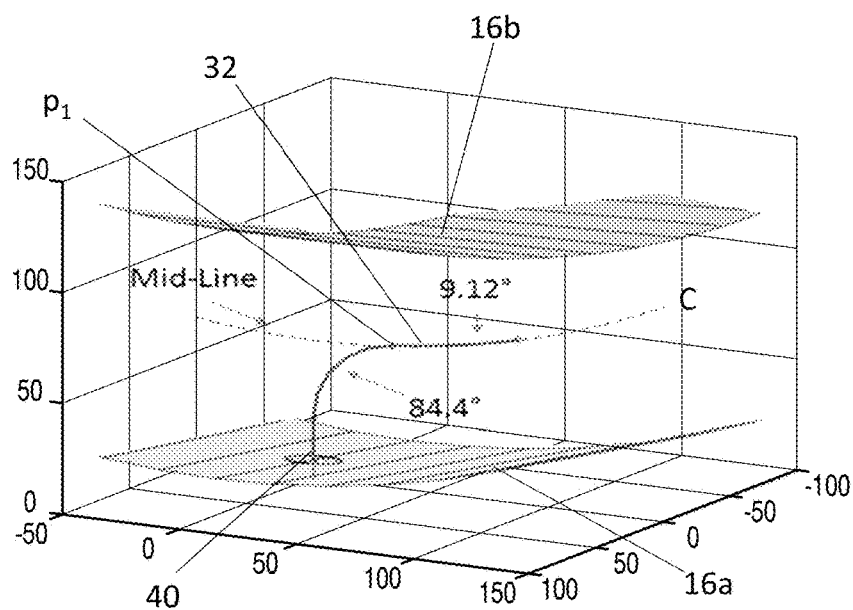
FIG. 4 shows how the desired path of a probe in the combustion chamber of FIG. 3 may be determined.

Thus, as shown in FIG. 4, the path of the arm 32 can be divided into two segments. A first segment enters through the entry port 40 in the outer wall 16a and bends through an initial angle of 84.4° to reach an initial point $p_1$ where it intersects the path C. The second segment, being the remainder of the arm 32, follows the path C with a constant curvature (in this case in the opposite sense to the curvature of the first segment) such that each section bends through an angle of 9.12°.

The initial angle and initial point $p_1$ will be dependent on a number of factors, including the location of the entry port 40, the distance between the entry point and the path C and the direction of the subsequent second section of the arm. However, for an entry port 40 on the inner or outer wall of a toroidal space, it is likely to be slightly under or over 90°. The initial angle can be determined manually, or can be computed from inputs of the relevant factors.

Figure 5:
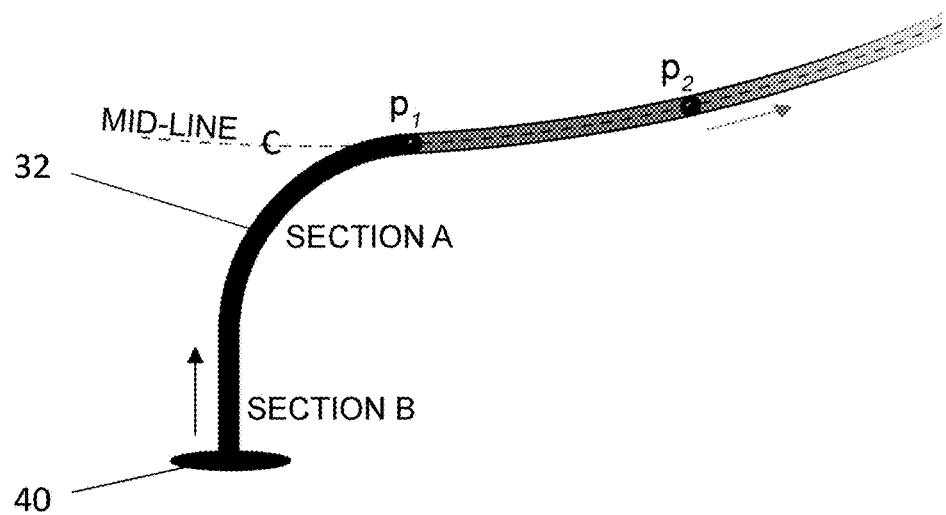
FIG. 5 shows an arrangement of a probe according to embodiments of the present invention.

To advance the arm 32 along the path C, using a tip-following approach ("curve following" as the tip will always follow the curved path C), an optimisation process is employed which is used to drive the actuation mechanism 36 and advance the arm 32 and the tip along the path C. FIG. 5 shows the parameters for the optimisation. When the arm 32 is advanced the driving algorithm aims to maintain the curve of the distal section against the desired curvature by adjusting the bend of sections A and B (being the sections of the arm 32 which are not already following the path C; the distal sections which are already following the path C can be maintained in their existing configuration as they will simply translate circumferentially along the path). This is achieved by minimizing the error in two co-ordinates: the start of the distal section ($p_1$–the initial point), and the end ($p_2$) (although it will be appreciated that, as the arm is following a fixed curve, other points which are in the region of constant curvature could be chosen instead of the end point). Since the curvature of the path C is homogenous throughout the navigation, it is possible to only calculate for one section length's worth of advancement since the process can be repeated throughout the length of the arm.

Figure 6:
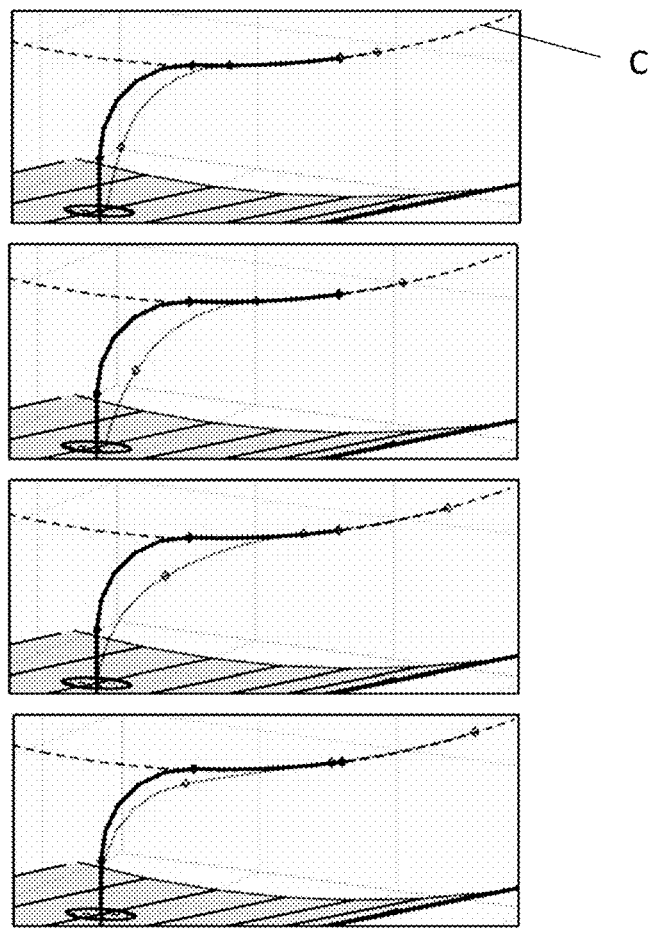
FIG. 6 is a series of images showing how a probe according to an embodiment of the present invention advances through the space.

FIG. 6 shows a simulation of the initial stages of the progression of the arm using the optimisation process described in more detail below. The heavy line is the desired path of the arm, whilst the lighter path is the actual path of the arm. Joins between sections of the arm are depicted by dots. As in previous figures, the dashed line shows the path C which it is desired to follow.

The starting point is the configuration of FIG. 5 in which two sections of the arm are inside the chamber. The figures in FIG. 6 show the progression of the arm 32 as the next complete section of the arm is introduced. It can be seen that the distal section ($p_2$) follows the path C closely as it advances along it, but that there is some deviation of the section being introduced into the chamber from the desired path as the section is introduced, with this deviation reducing as the complete section is introduced.

An example optimization process for determining the positioning and orientation of the arm 32 will now be described. However, it will be appreciated that other optimization processes can be used.

It is well-known that the effectiveness of an optzimization process is largely determined by the definition of the objective function. The main problem with creating objective functions for hyper-redundant manipulators has been that the optimization function has to include both the accuracy of the tip position (which is normally relatively simple) as well as the deviation of the remainder of the arm from the desired path (which is not so simple).

However, in the present embodiment, the objective function can be simplified as it is only reliant on comparison of the path with the points $p_1$ and $p_2$. Therefore, for each advancement of the tip op, which results from a linear advancement δb of the arm at the base, the objective function can be written as:

$$f(\delta b) = \text{Max} \ [\alpha \cdot |P_1(b+\delta b) - p_1| + \beta \cdot |P_2(b+\delta b) - (p_2 + \delta p)|]$$

Where $P_1(x)$ and $P_2(x)$ are the calculated positions of points $p_1$ and $p_2$ for an advancement of x at the base of the arm. α and β are weighting coefficients which are used to tune the performance of the objective function. Usually β will be chosen to be significantly larger (e.g. by an order of magnitude) than a as the position of the tip is much more important than the intermediate arrangement of the arm, but this may vary depending on the circumstances (e.g., in a particularly constrained access situation, deviation in $p_1$ may be undesirable and so the weightings may be more even, or even reversed).

Figure 7:
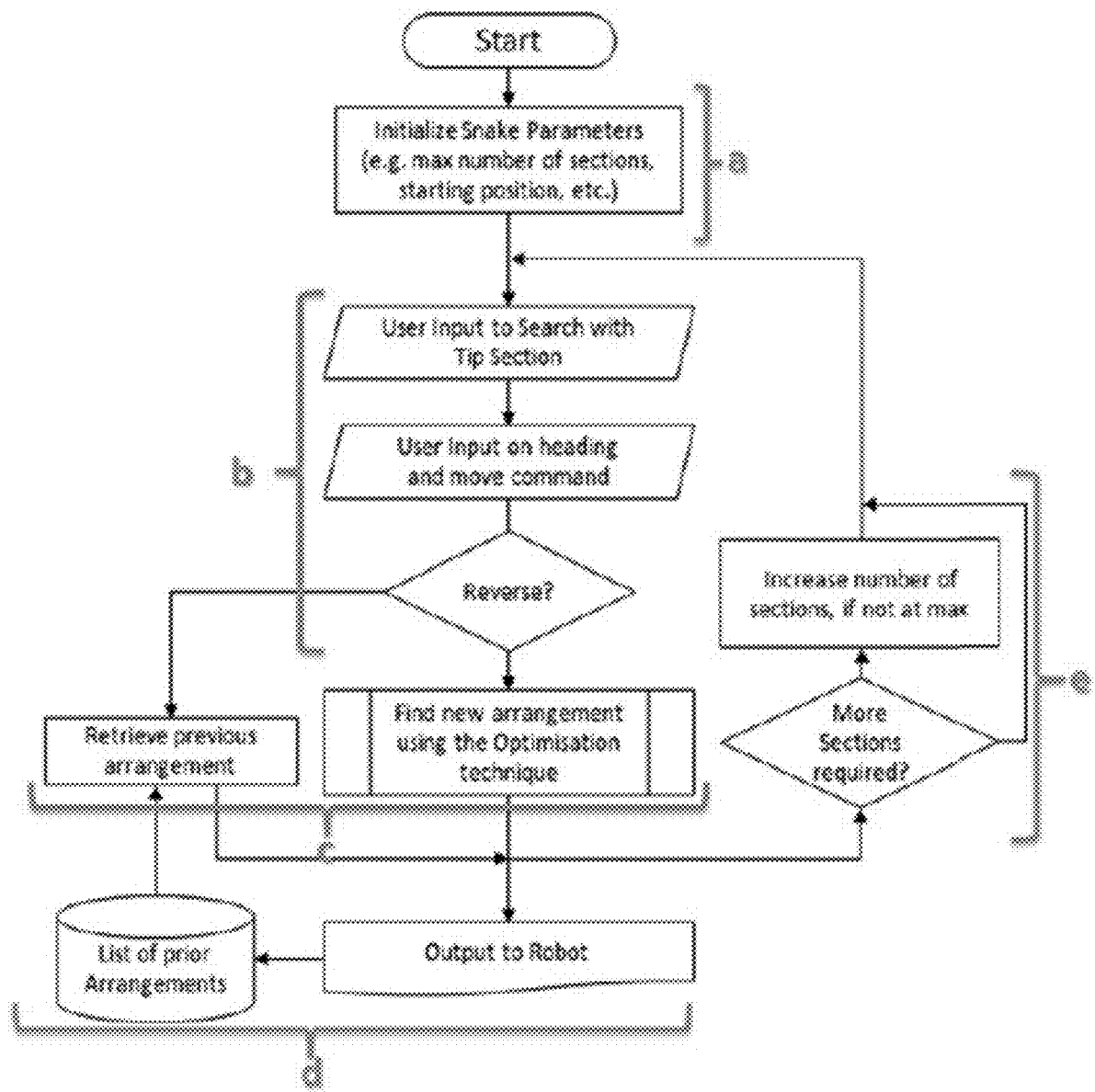
FIG. 7 is a flow chart showing a method according to an embodiment of the present invention.

The objective function can then be used in a movement algorithm such as the following, which is also depicted schematically in FIG. 7. In block "a" the relevant parameters (such as the number of sections in the arm and the initial angle) are initialised. Optionally in blocks "b", user input is provided which decides whether it is desired to move the arm forward (further into the chamber) or to reverse and withdraw the arm, and how far. In the case of forward motion, this determines the value of op and the optimization proceeds to find a new arrangement of the sections of the arm. Alternatively, if the user wishes to reverse, the previous orientation is retrieved from a store of prior arrangements (such as a memory device). Once a new arrangement has been determined by the optimization function, the appropriate instructions are sent to the actuation mechanism and the position information is recorded in the memory device for future reference (blocks "d"). The system then verifies whether another step is feasible, or if the next section should be added to the arm by the feed-in mechanism (blocks "e"). The cycle then repeats from the initial movement decision point.

Figure 8:
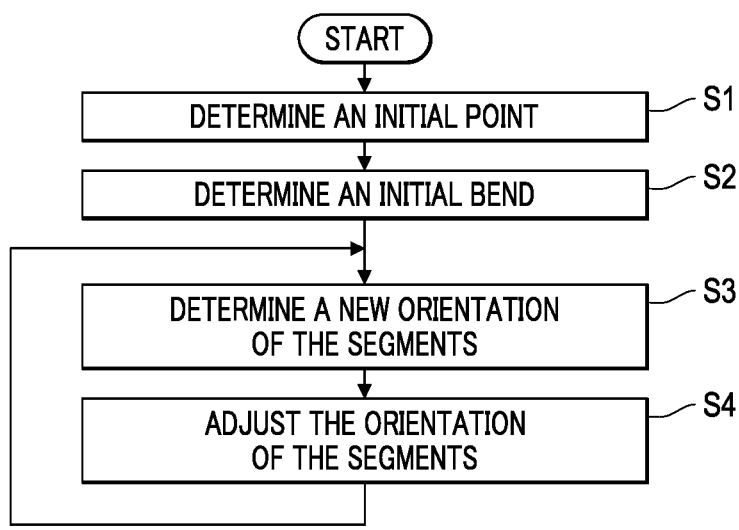
FIG. 8 is a flow chart showing a method according to an embodiment of the present invention.

The method for guiding the probe inside the combustion chamber 16 (i.e., the constrained space) is illustrated in FIG. 8. The method includes determining an initial point $p_1$ where the probe intersects the path C (i.e., a predetermined curve) which defines a circle or part circle within the space (S1); and determining an initial bend for the probe between the entry port 40 (i.e., entry point) on a surface of the combustion chamber 16 and the initial point p1 (S2). The process then includes repeatedly determining a new orientation of the sections 33 (i.e., segments) which results in an advancement of the distal end to a new position which is on the path C, the new orientation being determined so as to minimise the deviation between each of: a) the point on the probe where the probe starts to follow the path C and the initial point p1, and b) a point $p_2$ on the probe closer to the distal end than the point where the probe starts to follow the path C and the path C (S3); and adjusting the orientation of the sections 33 to the new orientation and advancing the probe so that the distal end is located at the new position (S4).

As a result of the simplifications to the optimization process that can be made by the reliance on the two points for navigation, the computational load of the optimizing step (which is the rate-limiting step), significant performance improvements were obtained compared to, for example, a similar approach without such constraints as mapped out in Palmer et al.

Performance improvements in the control of hyper-redundant manipulators can take two forms: faster computation can allow faster movement/progression of the tip with the same accuracy; or faster computation can mean that more accurate solutions are searched for by either considering a greater range of possible configurations, or by using smaller incremental advancements (op in the above description).

By comparing the performance of the tip-following approach in Palmer et al. and the approach of the present embodiment, it was found that the optimization step of the present embodiment took approximately 20% of the time taken for the optimization step of Palmer et al. using the same increments.

Further, once a pattern of movements have been determined for the advancement of a whole section of the arm into the target space, the orientations for each partial step of the advancement for a particular op can be stored and used for the insertion of the next segment, rather than calculating afresh.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for guiding a probe inside a constrained space (16), wherein the probe is a hyper-redundant manipulator (30) comprising a plurality of independently-orientable connected segments (33) extendable between a proximal end and a distal end inside the constrained space, the method including the steps of:

determining: an initial point (pi) where the probe intersects a predetermined curve (C) which defines a circle or part circle within said constrained space; and an initial bend for the probe between an entry point (40) on a surface of the constrained space and the initial point; and, repeatedly:

determining a new orientation of said segments which results in an advancement of the distal end to a new position which is on said curve, the new orientation being determined so as to minimise a deviation between each of: a) a point on the probe where the probe starts to follow said curve and the initial point, and b) a point ($p_2$) on the probe closer to the distal end than the point where the probe starts to follow said curve; and adjusting an orientation of said segments to said new orientation and advancing the probe so that the distal end is located at the new position.

2. A method according to claim 1 wherein the steps of determining the new orientation and adjusting the manipulator are performed in real-time or substantially in real-time.

3. A method according to claim 1 wherein the constrained space is toroidal.

4. A method according to claim 1 wherein the curve defines a mid point of the space.

5. A probe system for accessing a constrained space (16), the probe system comprising:

a hyper-redundant manipulator (30) having a plurality of independently-orientable connected segments (33) extendable between a proximal end and a distal end; and a controller, wherein the controller is arranged to control the orientation of said segments so as to position the distal end in a desired position by:

determining: an initial point (pi) where the probe intersects a predetermined curve (C) which defines a circle or part circle within said constrained space, and an initial bend for the probe between an entry point (40) on a surface of the constrained space and the initial point; and, repeatedly:

determining a new orientation of said segments which results in an advancement of the distal end to a new position which is on said curve, the new orientation being determined so as to minimise a deviation between each of: a) a point on the probe where the probe starts to follow said curve and the initial point, and b) a point ($p_2$) on the probe closer to the distal end than the point where the probe starts to follow said curve; and sending actuation signals to the manipulator so to as to cause adjustment of an orientation of said segments to said new orientation and advance the probe so that the distal end is located at the new position.

6. A probe system according to claim 5 wherein the controller performs the steps of determining the new orientation and adjusting the manipulator in real-time or substantially in real-time.

7. A probe system according to claim 5 further including an end-effector (34) at the distal end of the manipulator.

8. A probe system according to claim 5 wherein the constrained space is toroidal.

9. A probe system according to claim 5 wherein the curve defines a mid point of the space.

10. A probe system according to claim 5 further including a feed-in mechanism (38) for advancing the probe.

11. A probe system according to claim 5 further including an actuation mechanism located at or near the proximal end, the actuation mechanism either being linked to actuators on each segment or arranged to directly drive the motion of each segment.

* * * * *